US007200809B1

(12) United States Patent
Paul et al.

(10) Patent No.: US 7,200,809 B1
(45) Date of Patent: Apr. 3, 2007

(54) MULTI-DEVICE SUPPORT FOR MOBILE APPLICATIONS USING XML

(75) Inventors: Jyotirmoy Paul, Redwood Shores, CA (US); Jeff Barton, South San Francisco, CA (US); Anit Chakraborty, Redwood City, CA (US); Siva Dirisala, Kakinada (IN)

(73) Assignee: Oracle International Corporation, Redwood Shores, CA (US)

( * ) Notice: Subject to any disclaimer, the term of this patent is extended or adjusted under 35 U.S.C. 154(b) by 716 days.

(21) Appl. No.: 09/631,884

(22) Filed: Aug. 4, 2000

Related U.S. Application Data (60) Provisional application No. 60/222,817, filed on Aug. 4, 2000, provisional application No. 60/147,217, filed on Aug. 4, 1999.

(51) Int. Cl.
*G06F 15/00* (2006.01)
*G06F 17/00* (2006.01)

(52) U.S. Cl. ...................... 715/517; 715/522; 715/523; 715/513

(58) Field of Classification Search ................ 715/522, 715/523, 517, 513
See application file for complete search history.

(56) References Cited

U.S. PATENT DOCUMENTS

| | | | |
|---|---|---|---|
| 5,708,780 A | 1/1998 | Levergood et al. | |
| 5,764,916 A * | 6/1998 | Busey et al. | ................. 709/227 |
| 5,790,800 A | 8/1998 | Gauvin et al. | |
| 5,835,712 A | 11/1998 | DuFresne | |
| 5,835,914 A | 11/1998 | Brim | |
| 5,905,486 A | 5/1999 | Brittenham et al. | |
| 5,918,013 A | 6/1999 | Mighdoll et al. | |
| 6,012,098 A * | 1/2000 | Bayeh et al. | ................ 709/246 |
| 6,023,714 A * | 2/2000 | Hill et al. | .................... 715/513 |
| 6,125,391 A * | 9/2000 | Meltzer et al. | .............. 709/223 |
| 6,154,738 A * | 11/2000 | Call | .............................. 707/4 |
| 6,167,441 A * | 12/2000 | Himmel | ...................... 709/217 |
| 6,212,640 B1 * | 4/2001 | Abdelnur et al. | ........... 713/201 |
| 6,226,675 B1 * | 5/2001 | Meltzer et al. | .............. 709/223 |
| 6,233,608 B1 | 5/2001 | Laursen et al. | |
| 6,247,048 B1 | 6/2001 | Greer et al. | |
| 6,269,373 B1 | 7/2001 | Apte et al. | ..................... 707/10 |
| 6,279,121 B1 | 8/2001 | Gamo | |
| 6,292,657 B1 | 9/2001 | Laursen et al. | |
| 6,300,947 B1 | 10/2001 | Kanevsky | |
| 6,301,471 B1 | 10/2001 | Dahm et al. | |
| 6,336,124 B1 | 1/2002 | Alam et al. | |

(Continued)

OTHER PUBLICATIONS

Siyan. Karanjit; NetWare TCP/IP and NFS; Copyright 1994 by New Riders Publishing; pp. 11, 94, 103.*

*Primary Examiner*—Doug Hutton
*Assistant Examiner*—N Hillery
(74) *Attorney, Agent, or Firm*—Hickman Palermo Truong & Becker LLP (57) ABSTRACT

Techniques are provided that allow mobile devices to use database applications without having to specifically design the database applications to support all forms of mobile devices. In particular, techniques are provided in which the data coming out of a database application is formatted into Extended Markup Language (XML). The XML is the same regardless of which client is to receive the data. Prior to supplying the data to a client, the Extended Style Sheet (XSL) is applied to the data to format the data into the format required by the client.

21 Claims, 4 Drawing Sheets

U.S. PATENT DOCUMENTS

| | | | |
|---|---|---|---|
| 6,345,279 B1 | 2/2002 | Li et al. | |
| 6,353,850 B1 | 3/2002 | Wies et al. | |
| 6,412,009 B1 * | 6/2002 | Erickson et al. | 709/228 |
| 6,421,733 B1 | 7/2002 | Tso et al. | |
| 6,430,624 B1 | 8/2002 | Jamtgaard et al. | |
| 6,463,440 B1 | 10/2002 | Hind et al. | |
| 6,463,565 B1 | 10/2002 | Kelly et al. | 716/1 |
| 6,473,609 B1 | 10/2002 | Schwartz et al. | |
| 6,477,565 B1 | 11/2002 | Daswani et al. | |
| 6,480,860 B1 * | 11/2002 | Monday | 707/102 |
| 6,507,867 B1 * | 1/2003 | Holland et al. | 709/219 |
| 6,510,434 B1 * | 1/2003 | Anderson et al. | 707/100 |
| 6,519,617 B1 * | 2/2003 | Wanderski et al. | 715/513 |
| 6,523,062 B1 * | 2/2003 | Bridgman et al. | 709/203 |
| 6,526,439 B1 | 2/2003 | Rossmann et al. | |
| 6,535,896 B2 * | 3/2003 | Britton et al. | 715/523 |
| 6,546,406 B1 * | 4/2003 | DeRose et al. | 715/513 |
| 6,560,633 B1 * | 5/2003 | Roberts et al. | 709/202 |
| 6,589,291 B1 * | 7/2003 | Boag et al. | 715/513 |
| 6,593,944 B1 | 7/2003 | Nicolas et al. | |
| 6,594,774 B1 | 7/2003 | Chapman et al. | |
| 6,604,106 B1 * | 8/2003 | Bodin et al. | 707/101 |
| 6,615,212 B1 | 9/2003 | Dutta et al. | |
| 6,633,914 B1 * | 10/2003 | Bayeh et al. | 709/227 |
| 6,635,089 B1 * | 10/2003 | Burkett et al. | 715/513 |
| 6,658,625 B1 * | 12/2003 | Allen | 715/523 |
| 6,681,245 B1 | 1/2004 | Sasagawa | |
| 6,724,403 B1 | 4/2004 | Santoro et al. | |
| 6,741,853 B1 | 5/2004 | Jiang et al. | |
| 6,754,660 B1 | 6/2004 | MacPhail | |
| 6,788,667 B1 | 9/2004 | Beresin | |
| 6,857,010 B1 | 2/2005 | Cuijpers et al. | |
| 6,871,236 B2 | 3/2005 | Fishman et al. | |

* cited by examiner

Mobile UI Architecture for RF devices

MULTI-DEVICE SUPPORT FOR MOBILE APPLICATIONS USING XML

PRIORITY CLAIMS

This patent application claims priority from,

U.S. Provisional Patent Application Ser. No. 60/147,217, filed on Aug. 4, 1999, entitled MULTI-DEVICE SUPPORT FOR MOBILE APPLICATIONS USING XML; and U.S. Provisional Patent Application Ser. No. 60/222,817, filed on Aug. 4, 2000, entitled TECHNIQUES FOR IMPLEMENTING MOBILE AND INDUSTRIAL DATABASE APPLICATIONS;

the content of which are hereby incorporated by reference in their entirety.

FIELD OF THE INVENTION

The present invention relates to database systems and, more particularly, to techniques that allow mobile devices to use database applications.

BACKGROUND OF THE INVENTION

Database applications are software applications that communicate with a database server to store data into and retrieve data from a database. Common database applications include accounting programs and inventory programs. Typically, database applications are designed to receive input from computer systems and fixed computer terminals. In order to input the data into the database applications, a user often has to manually record the data, bring the manually recorded data to the place at which the fixed computer system is located, and enter the manually recorded data into the fixed computer terminal.

To make data entry more efficient, mobile devices may be used to input data into the database application. For example, a hand-held bar code reader could be used to scan bar codes from labels on merchandise in a warehouse to have inventory data input directly into an inventory program. However, for such devices to be used with a database application, the database application has to be designed to support the devices. Unfortunately, it is cost prohibitive to try to duplicate all the functionality of a database application for each possible mobile platform.

Based on the foregoing, it is clearly desirable to provide techniques that allow mobile devices to use database applications without having to specifically design the database applications to support all forms of mobile devices.

SUMMARY OF THE INVENTION

Techniques are provided that allow mobile devices to use database applications without having to specifically design the database applications to support all forms of mobile devices. In particular, techniques are provided in which the data coming out of a database is formatted into Extended Markup Language (XML). The XML is the same regardless of which client is to be supplied with the data. Prior to supplying the data to a client, the Extended Style Sheet (XSL) is applied to the data to format the data into the format required by the client.

According to one embodiment, a Telnet Markup Language (TML) is used to replicate the behavior of the database applications. When the device is a client that supports the Telnet protocol, an XSL document is applied to format the XML from the database into a Telnet markup language ("TML"). A Telnet server then uses the TML to provide an interface to the Telnet device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system are provided for allowing users of mobile devices to communicate with database applications. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Being able to enter data directly into database applications using mobile devices, such as bar-code readers, will improve efficiency and reduce data entry errors, in short making a person more effective. It also provides real-time information of the system since data can be entered as a transaction is being performed. Bar-code readers with wireless RF communications would further help in performing transactions from anywhere within an inventory warehouse.

There are several types of hand-held devices that are used in the industry which have different hardware and software capabilities. These devices can be just dumb-terminals supporting Telnet to full fledged miniature PCs with their own operation system, browsers and support for writing applications. The user friendliness of an application depends on the sophistication of the device. The user interface ("UI") design principles for hand-held devices are entirely different from those for PCs because of their limited screen size and keyboard.

According to one embodiment, a system is provided to support applications on mobile devices. In particular, a system is provided that uses XML and XSL to create a generic framework that could be customized to various types of hand-held devices.

Hypothetical Hand-Held Devices

There are several hand-held devices with varying capabilities available in the industry. Rather than describe the present system with reference to specific handheld devices, reference shall be made to a set of hypothetical devices that generally represent categorical types of devices. These hypothetical devices are listed in the increasing level of their support for customization.

DT These are dumb terminals that support a particular protocol, such as Telnet. These terminals actually behave like any of the following terminals depending on the terminal and server emulation capabilities.

HT1 These are terminals that support data entry and formatting, such as devices supporting HTML 3.0 (and above) or similar protocols. They should also support event handling.

HT2 These are same as HT1 terminals with scripting functionality, such as devices supporting HTML 3.0 (and above) and JavaScript or VBScript. These devices should also support HTML frames.

JT These are same as HT2 terminals with built in JVM and support for running Java Applets.

GT These are general purpose devices that provide their own software development kit ("SDK") to write applications.

Depending on the limitations of each of the above devices, the application user interface and navigation flow will vary. Without concern to the device limitations, an application should be represented using a meta-data language like XML. Separate XSL style sheets are developed for each device for presentation, keeping their limitations in mind. Also, DT and HT1 devices require transactional state management at the server side, while HT2, JT and GT terminals can be designed to hold some of the transactional state on the client side and also can be optimized for the network round trips. However, since the network for these RF devices is typically a LAN, the bandwidth is mainly limited by the number of devices used at any time and there will not be any delay due to routing.

Application Functionality

Some of the features that exist in PC-based applications are very useful even on hand-held devices. Unfortunately, it may not be possible or practical to provide all of those features to the hand-held devices because of the screen and keyboard limitations of the hand-held devices. According to one embodiment, the following features of database applications are provided to hand-held devices using the techniques described herein. System requirements and implementation complexity to support each of these features are also discussed with respect to the hypothetical devices identified above.

Status bar: As a transaction is being performed, various messages may have to be shown to the user. A status bar at the bottom of the display screen is ideal for displaying informative messages and warnings. If the message is large then the entire display screen could be used to display it. This functionality can be done on all the devices. However, this would be suitable only on devices that have sufficient screen height so that there will be enough space for the main display.

Online Field Validation: As the user enters a field and navigates, (could be manual tabbing or may be automatic after the bar-code reading) the entered data must be validated. Doing this on a HT1 device would require maintaining state on the server. Also, if the HT1 terminals do not support event handling like a on Change or on Tab trigger, then it would not be possible to do field level validation. In such cases, the entire transaction has to be submitted and the validation should be done on the entire data.

Data sensitive forms: The user interface of the form will vary based on the data that is entered. This is more suitable for JT or GT devices. However, it should be noted that through complicated programming this may be performed on HT1 and HT2 devices but requires refreshing the entire form whenever such a change in UI is required. Preferably, the screen refreshing is fast enough to make this feature user friendly.

List of enterable values: Sometimes the user would like to pick the value from a list of existing values. The list can be static or dynamic based on the context. This can be done easily on HT2 and above devices. This feature may be implemented, for example, using client-side scripting and dynamically creating user interface (using document.write in Javascript, for example). Three scenarios in which a user tries to get a list of values by using a wild card selection, and the corresponding expected behavior, are identified in Table 1.

TABLE 1

| Resulting List | Number of records in the list of enterable values and the corresponding required behavior. Expected behavior |
|---|---|
| Multiple values | Show the list. When the user selects a value fill the field with the selected value and navigate to the next field. |
| Single value | Fill up the field automatically and navigate to the next field |
| No value | Indicate an error and focus the same field to enter again |

HT1 devices would again require round trip to get back the already entered form with the new selected value for the current field with focus to the next enterable field.

Client side validation: Some devices/protocols provide data format and data type validations at the client side without communicating to the server. Also, some fields must be entered while the others might be optional. HT1 devices with built in format/type validations or HT2 devices can support some of the simple client side validation.

Transaction spanning multiple pages: Depending on the complexity of the transaction, sometimes it might be necessary to organize the transaction as a deck of multiple pages, each one to enter a particular piece of logical information. In DT and HT1 devices this requires a round trip and state management at the server. The architecture for HT2 devices can be designed to avoid these round trips which would display pages without delay. This can be easily implemented in JT and DT devices.

Information caching: Some information may be referenced frequently and caching such information on the client side would reduce round-trips to the server. JT and GTs can usually support this functionality. Limited information can also be stored in HT2 devices.

XML and XSL

To support the mobile user interface on a variety of hand-held devices, a system is provided that uses XML to generate device-independent content, and XSL to convert the device-independent content to device-specific content. In particular, application specific data is generated using XML, which is independent of the device type to which the data is to be provided. XSL style sheets are written for each device for presenting the generated XML data. This approach clearly separates the application logic from the device specific presentation logic. Supporting applications on any new device with its own protocols only requires writing the corresponding XSL stylesheets for that new device, as opposed to rewriting the interface logic of the database application to provide specific UI support for the device. According to one embodiment, generic display and control functions a generated using a scripting language that HT2, JT and GT terminals support, and these functions are used along with the XSL stylesheets to provide a user interface and data in a manner that can be handled by the mobile device. Further, using scripting and maintaining state on the client reduces redundant information exchange between a client and the server.

Information Exchange

A document type definition file ("DTD") defines how non XML data is to be converted into XML. According to one embodiment, DTDs are used to define how data that is generated by the database application is to be converted into XML. For example, a DTD may indicate that data from a particular database field should be wrapped with specific XML tags to produce XML output. According to one embodiment, the several pieces of data that flow between a client and a server are identified, and DTDs are developed for each piece of such data.

A list of various kinds of data exchanged between a client and the server in a typical application is set forth below:

Information from the server to a client: The following lists some of the most common information that is served by the server to a client.

Main data entry form: This could include a menu of supported transactions or a transaction itself. Standard UI elements like text fields, buttons, poplists and choice boxes are supported in different protocols. Data type, format and field width are supported directly by protocols or can be validated through simple client-side scripting functions. Even though different protocols have different mechanisms for data entry and validation support, the required behavior can be captured using XML meta-tags and then XSL stylesheets can be written for each device according to its capabilities and the protocols it supports. For example, HDML has implicit support for data format but HTML does not have a format validation. However, in HT2 and above devices format validation can be achieved using JavaScript or VBScript functions.

Queried data: When the user wants to see a list of values, the client tells the server to send the required data, and the server responds by retrieving the required data and supplying it to the client. If the query is very generic, then the result set might consist of several records. There may be limitations on the amount of data that can be transmitted for some protocols. For example, in HDML the size is limited close to 1 KB. Hence, the XML meta data representation of a list should be capable of providing information for browsing few list elements at a time or specify a warning. A warning generated in response to a result set being too large may, for example, ask the user to revise the query criteria. The application of the appropriate XSL takes care of implementing the navigation for a specific protocol/device.

Error/Warning Messages: In HT1 and above browsers, errors and warnings can be shown on the status bar or some similar special screen area. Both visual and audio cues can be provided depending on the device capabilities.

Information from a client to the server:

Form level Query data: The user might have to update an existing entity or a pending transaction. This requires querying the data based on some search criteria.

Field level Query data: The user might want to get the list of enterable values for a field by providing a wild-card search criteria. The amount of such information transferred from the client to the server is very little. However, on DT and HT1 terminals, the original form has to be rendered again from the server once a value is chosen from the list. HT2 and above devices would avoid this round trip since they maintain the state on the client side and can render the original form with values for the already entered fields and the newly selected field.

System Architecture

Figure 1:
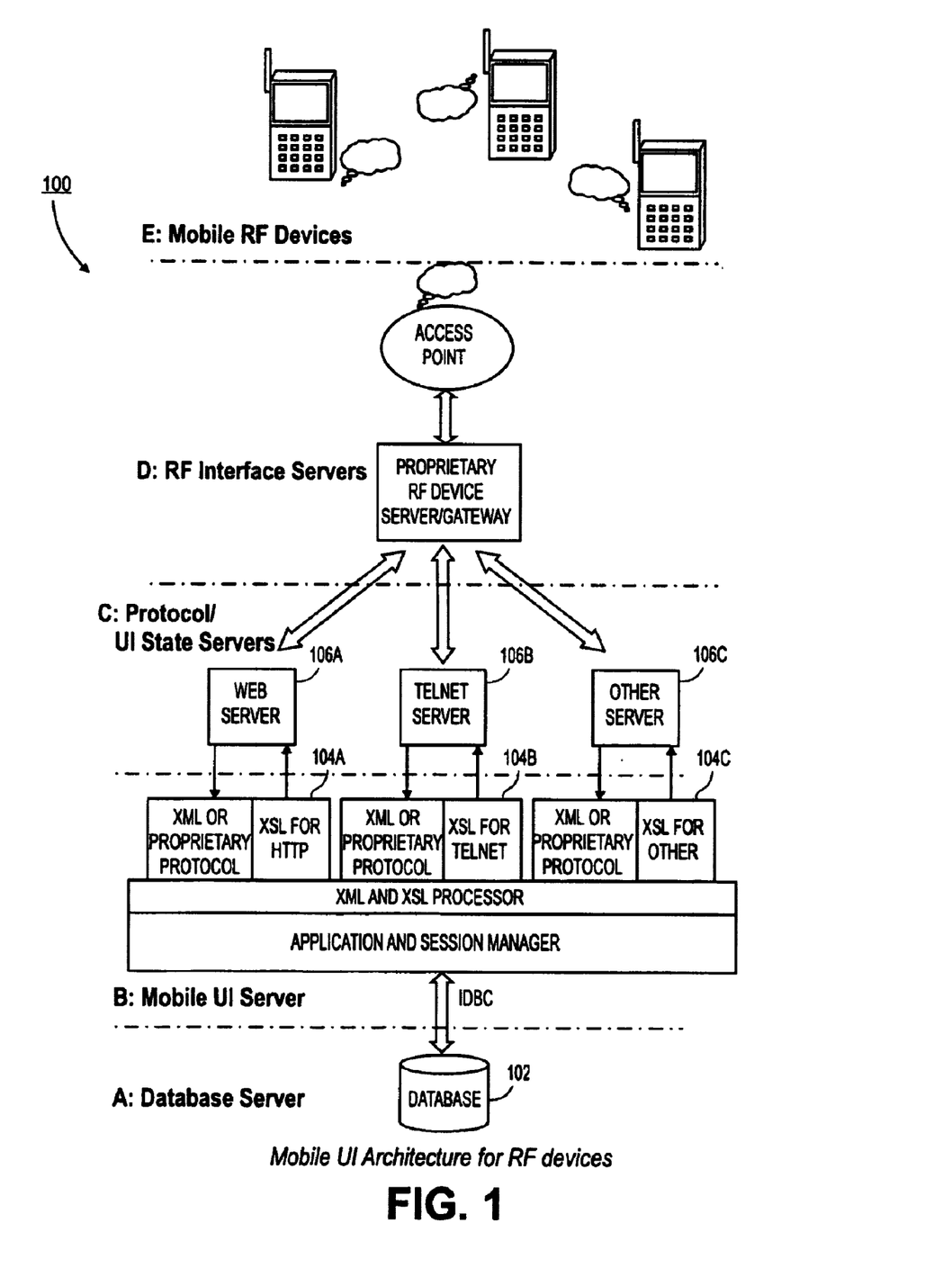
FIG. 1 is a block diagram illustrating various layers of a system designed according to an embodiment of the invention.

Referring to FIG. 1, it is a block diagram showing the overall architecture of a Mobile UI system 100 for RF devices, according to one embodiment of the invention. The architecture has five different layers. Layer A is the database layer. The database layer typically includes a database server with which conventional database applications communicate to store data into a database 102, and retrieve data from the database 102.

Layer B includes the main mobile UI server that implements the application logic and generates the resulting data in XML. Different XSL style sheets 104 can be applied on the resulting XML data to be able to support the applications on different types of mobile devices using different protocols. In the illustrated embodiment, the application of XSL style sheets 104a, 104b and 104c to XML causes the XML to be formatted in the manner required by a web server 106a, a Telnet server 106b, and some other server 106c, respectively. XSL style sheets 104 are the main piece of code to support the existing mobile application functionality on any new device with a new protocol.

The application logic and the user interface control are implemented only once using XML. The XML data is generated on predefined DTD files. Once the right XSL is applied, then the resulting output stream is sent to the appropriate server 106 in layer C.

The servers 106 in layer C implement the corresponding communication protocol. Additionally, servers 106 maintain the UI state information for DT and HT1 devices. If the UI state can be maintained on the client device, as in case of HT2, JT and GT terminals, then the UI state logic will have to be implemented on those client devices. However, it should be noted that most of the UI state logic is generic and hence needs to be developed only once. All the different kinds of transactions can use the same UI state logic. Only their respective functional logic has to be separately implemented on the MUI server.

Layer D is completely provided by the device vendors. Communication between Layer D and Layer C may be performed, for example, through TCP/IP protocol. Most RF device servers communicate using TCP/IP.

Communication between Layers D and E is proprietary to the device vendors. According to one embodiment, application login security is provided. Security during the RF and network communication is dependent on the RF servers and devices provided by the different vendors. If the client devices in Layer E support scripting or code loading and execution like the HT2, JT and GT terminals, then the devices download these UI libraries at the time of login.

Subinventory Transaction Example

For the purposes of explaining the architecture and operation of system 100, an example shall be given of steps that allow an HT2 device to perform a particular type of transaction (the "SubInventory transaction") that is supported by a database application.

For an HT2 device to perform a SubInventory transaction, (1) DTDs are designed for different types of communication, like lists of values and messages. (2) General libraries are written to present data in XML format based on the above DTDs.

(3) Data collection logic is written for SubInventory transfer. This mainly involves writing SQL statements for a list of enterable values for various fields. (4) XSL stylesheets are developed that are suitable for HT2 devices. This assumes JavaScript support from the client device.

Since HT2 device supports client side scripting, (5) a standard forms library may be written in JavaScript that interprets and presents the form, maintains the state and displays messages.

Apart from these above steps, the application login screen, responsibility screen, menu and org display logic are separately designed. However, they use the same XML and XSL stylesheets. In the above implementation steps, the first three are done only once. Steps 4 and 5 have to be done for every new type of device that has to be supported with a new protocol or scripting language.

Design and User Interface Features

According to one embodiment, system 100 is implemented in a manner that reflects the design and UI principles discussed hereafter.

Security: Using wireless communication for data transmission raises security issues. From the application point of view, user login and authentication is supported as it is done in the PC based applications. However, the device vendors should provide a secure communication between a hand-held device and the access point. In JT and GT terminals, in-house security modules can be developed.

Usability:
  Menu Application Menu in hand-held devices may be modeled as a flat list instead of a tree structure. Since the screen width of these devices is very small, expanding options as a tree is not desirable. Hence, it is necessary that all the various forms that can be accessed from a mobile user (responsibility) be in a flat list structure instead of a tree structure.
  Browsable List of Values Most of the client devices have limited memory. If the user's selection criteria results in several records, then the user will be displayed only a fixed number of records and browsing through these records will be provided. Also, a text field is provided for the user to revise the search criteria while browsing. The SQL statement necessary for browsing can be represented as a template so that when the original SQL statement for getting the list of values is inserted into this template, it would provide the browsing functionality. The template is shown below

```
SELECT * FROM (SELECT T1.*,ROWNUM RN FROM   (
                                              sqlStmt
                                              ) T1
                ) T2
 WHERE T2.RN = :startRowNum AND T2.RN <= :endRowNum;
```

The DTD of the lov is designed to provide the browsing information.

Dynamic Field Display Sometimes a field might have to be displayed based on the data entered on some other field. The form will initially indicate all the fields but their display property will be off. When a value is chosen from the list of values, information about displaying additional fields can be obtained. The lov DTD has three types of columns for each record. The unique id columns, the display field columns and the hidden field columns. The following SQL example for a list of items illustrates these fields more clearly.

```
SELECT INVENTORY_ITEM_ID, /* unique id */
       CONCATENATED_SEGEMENTS,SUBSTR(NVL-
(DESCRIPTION,' '),1,50), /* display fields */
       DECODE(REVISION_QTY_CONTROL_CODE,1,0,1)   /*
hidden field. if revision has to be
displayed? */
    FROM MTL_SYSTEM_ITEMS_KFV
    WHERE ORGANIZATION_ID = :1
       AND UPPER(CONCATENATED_SEGMENTS) LIKE :2
ORDER BY 2;
```

In the above example, the fields in the first line correspond to the unique id, the fields in the second line correspond to the fields that have to be displayed and the fields in the third line correspond to the hidden fields that provide information about displaying other fields in the form. This SQL statement would go into the above browsing SQL template to provide the required records.

Status bar A status bar is assumed for each device and where a status bar is not feasible, it should be displayed on the entire screen. The DTD of a message is designed to provide information related to the type of message, where to display the message, what is the subsequent navigation path. Optionally, font, color and beeping can be indicated.

Example DTD

Below is a listing of the DTD for displaying a message on the client device.

<!ELEMENT MESSAGE (MSG,VISUAL*)>

<!ATTLIST MESSAGE msgType (E|W|M|H) #REQUIRED
  <!--
  E=Error, W=Warning, M=Message, H=Hint
  --

<!ATTLIST MESSAGE msgDisplay (F|S) #REQUIRED
  <!--
  Each device is assumed to have a status bar. If there is no status bar then the XSL can interpret the S attribute as a F attribute!
F=Display it on the full screen.
S=Display it on the status bar.
--

<!ATTLIST MESSAGE msgNavigPath (M|F|C) #REQUIRED
<!--
If the msgDisplay is F, then the user should have a navigation mechanism.
M=Menu, meaning the user should be taken to the main menu.
F=Form, meaning the user should be taken to the beginning of the current form.
C=Current, meaning the user should be taken to the current page which is being shown prior to the message display.
--

<!ELEMENT MSG (#PCDATA)

<!ELEMENT VISUAL EMPTY

<!ATTLIST VISUAL msgFont CDATA #IMPLIED

<!ATTLIST VISUAL msgColor CDATA #IMPLIED

<!ATTLIST VISUAL msgBeep (Y|N) #IMPLIED

A message is defined to have the actual message part and a visual attributes part. The visual attributes part is, however, optional. There are different types of messages like error, warning, message and hint. Also, a message could be displayed on the entire screen or just on the status bar. And in case it's displayed on the entire screen, then the navigation should be specified.

Significantly, the DTD that defines how a particular type of data (e.g. a "message") should be converted to XML does not presume any particular type of client device. Thus, it only needs to be created once for each type of data produced by the database application. Further, for any given message from the database application, the application of the DTD will always produce the same XML output regardless of the client device to which that output is to be sent. Because the XML output is the same regardless of the client device, and client devices have different capabilities, it is possible for the XML output to include display instruction data that specifies that the client is to display the data in a manner that is not actually supported by the particular client.

For example, an XML message that conforms to the DTD specified above may indicate that data is to be displayed on a status bar. However, some devices may not support a status bar. Under these circumstances, the XSL style sheet for that particular device may "override" the display instructions in the XML output. For example, for a client that does not support a status bar, the application of the client's XSL style sheet to an XML document that specifies that data is to be displayed on a status bar may produce client-specific output that causes the message to be displayed on the full screen of the client.

When a Subinventory transaction is entered and submitted, it could fail for some reason. If it fails, then the message could be displayed on the full screen with the navigation path set to C. This means, once the user clicks the OK button, he/she will be taken back to the page that is shown prior to submitting the transaction. However, if the transaction is successful, the user should be taken back to either the main menu (if value is M) or to the starting of the form (if the value is F). This kind of user interface behavior is encoded in XML message and, depending on the device, the corresponding XSL will take care of providing the necessary navigation.

Below is the listing for a sample XML representation of a message, as it would be produced based on the message DTD listed above.

<?xml version="1.0" standalone="no"?>

<!DOCTYPE MESSAGE SYSTEM "message.DTD">

<MESSAGE msgType='M' msgDisplay='F' msgNavigPath='F'>

<MSG>Transaction Successful

</MESSAGE>

The above XML representation indicates that the message is normal, that it has to be displayed on the entire screen and once the user clicks (selects), he/she is taken to the starting of the form with all the fields cleared.

Below is the listing for the XSL stylesheet designed for the HT2 terminal.

```
<?xml version="1.0"?>
<xsl:stylesheet xmlns:xsl="http://www.w3.org/XSL/Transform/1.0" result-ns="http://www.w3.org/TR/REC-html"
<!-- xsl:stylesheet xmlns:xsl="http://www.w3.org/TR/WD-xsl" result-ns="http://www.w3.org/TR/REC-html"--
<xsl:template match="MESSAGE">
  <html>
  <script language="JavaScript">
  var msgType='<xsl:value-of select="@msgType"/>';
  var msgDisplay='<xsl:value-of select="@msgDisplay"/>';
  var msgNavigPath='<xsl:value-of select="@msgNavigPath"/>';
  var msg='<xsl:value-of select="./MSG"/>';
  parent.showMessage(msg,msgType,msgDisplay,msgNavigPath);
  </script>
  <body bgcolor="#FFFFFF">
  </body>
  </html>
</xsl:template>
</xsl:stylesheet>
```

Based on this XSL style sheet, the actual display of the message and the navigation control is implemented as a standard JavaScript function that the HT2 device can use. Below is the listing of the corresponding functions.

```
function showMessage(msg,msgType,msgDisplay,msgNavigPath) {
  if(msgDisplay=='S') {
    displayStatus(msg,msgType);
    if(msgNavigPath=='M')
      showMenu( );
    else . . .
  }
  else
    . . .
}
function displayStatus(msg,msgType) {
  var doc=SAREA.document; // SAREA is the status area frame
  doc.open("text/html");
  doc.writeln("<html><body bgcolor='#CCCCCC'");
  if(msgType=='E')
    msg="<font color=red>"+msg+"</font>";
  else if(msgType=='W')
    msg="<font color=blue>"+msg+"</font>";
```

```
doc.writeln(msg);
doc.writeln("</body></html>");
doc.close( );
}
function clearStatus( ) {displayStatus(' ', 'M'); }
```

As the above code indicates, some of the UI presentation is common irrespective of the type of transaction being performed and hence, this kind of UI presentation library needs to be written only once for each type of device/protocol/scripting language combination. Thus, according to one embodiment, the four pieces of information that are implemented are:

XML data representation. This needs to be done only once.

Application logic. This needs to be done for each type of transaction.

XSL style sheets. These have to be written for each type of device/protocol/scripting language combination.

The UI state libraries may be implemented either on the client-side or as part of the communication protocols. For example in case of HT2 devices, this is done on the client side and in case of DT devices that use Telnet, the UI state handling is done as part of the Telnet server. This again has to be written primarily for each type of device/protocol/scripting language combination. However, some customization might be done for individual transactions.

Mobile Device UI

Many database applications currently run only on relatively powerful desktop computers. While this is definitely useful, there are many circumstances in which it would be useful and convenient to operate a database application using a mobile device. As mentioned above, a Mobile UI system is provided that provides configurable and intuitive user interfaces for mobile devices that support a web browser or a Telnet client. By transforming the forms used by applications to native format for a mobile device, interfaces that only could be accessed from PCs are now accessible to internet/intranet mobile devices.

Figure 2:
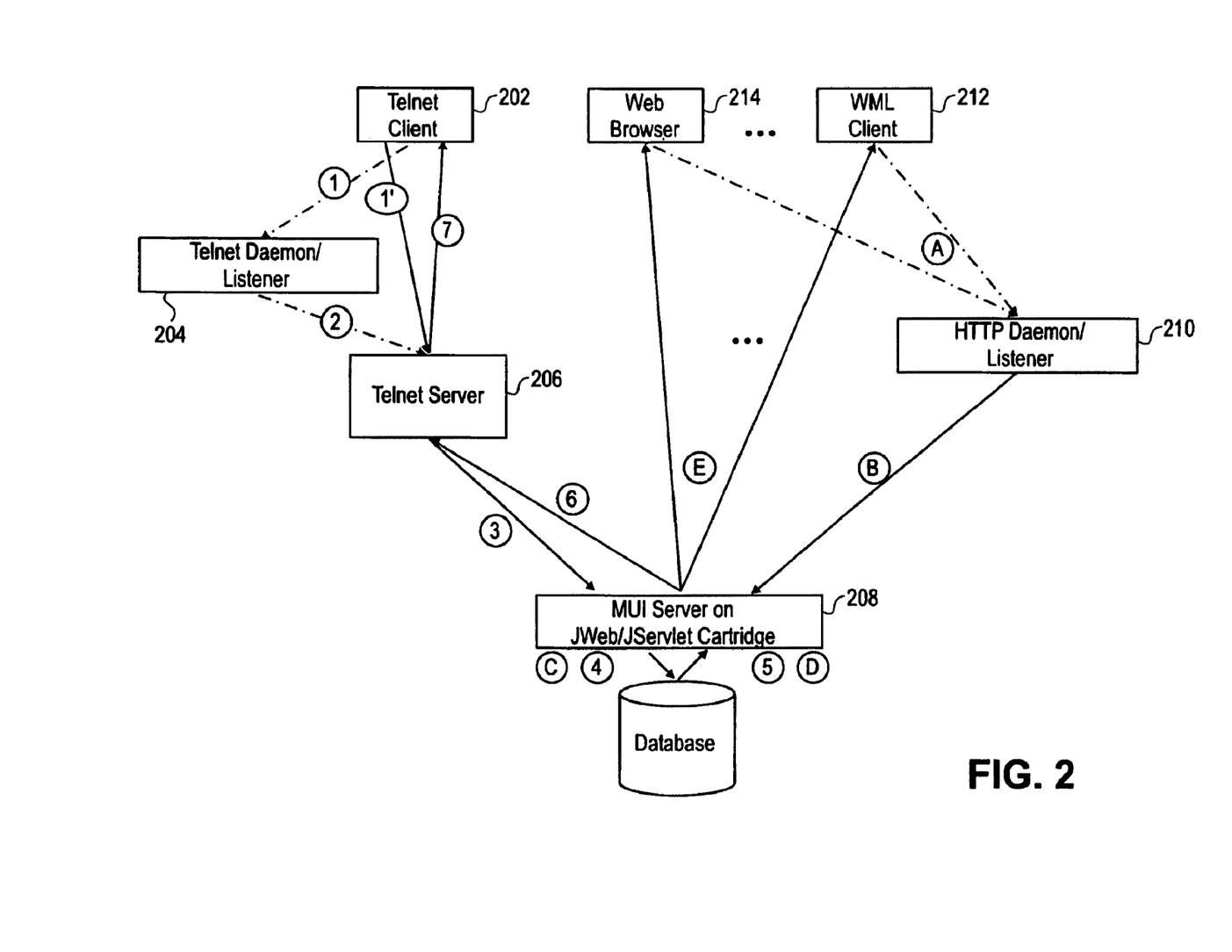
FIG. 2 is a block diagram illustrating message sequences in a system designed according to an embodiment of the invention.
Figure 3:
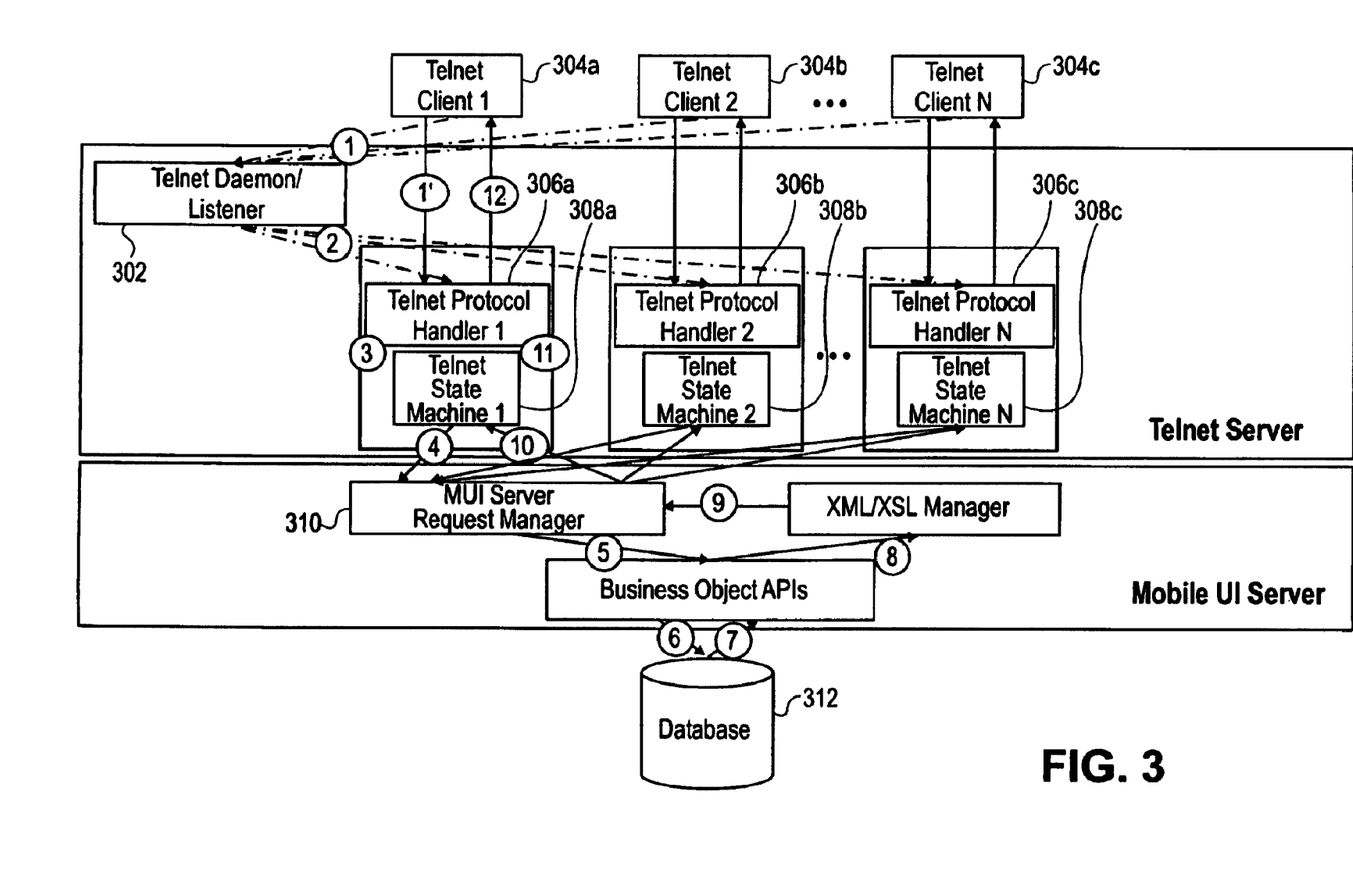
FIG. 3 is a block diagram illustrating a system including a Telnet server according to an embodiment of the invention.

FIGS. 2 and 3 are block diagrams that illustrate embodiments of system 100. In FIG. 2, the references 1 through 7 indicate the path of the request and response from/to a Telnet client, and the references A through E indicate the path of the request and response from/to an HTTP client. In FIG. 3, references 1–12 indicate the path of request and response from/to a Telnet client. According to one embodiment, the various components of system 100 are written using 100% Java. Consequently, the various components of system 100 may run on all platforms that can run the Java Virtual Machine.

The system shown in FIG. 2 includes a Telnet client 202, a Telnet Daemon 204, a Telnet Server 206, an MUI server 208, an HTTP Daemon 210, a WML client 212 and a web browser 214. Some of the components of the system illustrated in FIG. 2 shall now be described in greater detail.

The Telnet Daemon or Listener 204 is an instantiation of a class that handles all incoming connection requests from Telnet clients 202. The Telnet Daemon 204 spawns a new thread for each connection and initializes a Telnet protocol handler in the thread.

According to one embodiment, Telnet Server 206 includes a Telnet Protocol Handler and a Telnet state machine. The Telnet Protocol Handler implements the Telnet Protocol (RFC 854, 1053 and 1073) to handle data transmission between the Telnet client and the Telnet server 206. It creates an instance of the Telnet State Machine and uses an "Action" class to interact with the State Machine. It uses a Socket interface to communicate with the Telnet client. The options for the Telnet protocol, including session variables, are controlled using the "Telnet Options" class. The protocol handler is given a number of flags in the Action class from the Telnet State Machine, which completely define what to do with the client (both input and output).

According to one embodiment, the MUI server 208 runs on a JWeb/JServlet cartridge that contains a Java Virtual Machine and Java class libraries. The JWeb/JServlet cartridge 208 minimizes use of resources by running multiple threads in the Mobile UI Java application on the same virtual machine and handling multiple requests for the application using the same instance of the application. There is no start-up and shutdown of the Java Virtual Machine required for each request.

JWeb/JServlet provides a runtime environment for server-side Mobile UI Java applications. Java applications are platform-independent and they can access all the functionality of Java, including database access. Using JWeb/JServlet, the Java applications in the Mobile UI Architecture run on the application server and produce dynamic HTML and other markup languages for HTTP clients 214, and ASCII text output for Telnet clients 202. The Mobile UI JWeb/JServlet applications access the database through JDBC. JWeb/JServlet applications are three tier applications with HTTP/Telnet Clients, Java in the middle tier and a database in the backend. The JWeb/JServlet cartridge takes advantage of load-balancing, scalability, monitoring, logging, sessions, and other features of the Web Request Broker (WRB).

Since the Telnet client 202 is a "dumb" client, it merely displays what the Telnet Server 206 tells it to display. Unlike the HTTP client 214 that fully supports features such as HTML Forms and Javascript, the Telnet Server must take care of providing all this functionality for the Telnet client. The Telnet Protocol Handler is responsible for the display functions, but the Telnet State Machine is responsible for responding to all I/O from the user. If the user types something or uses an arrow key, the Telnet State Machine is responsible for telling the Telnet Protocol Handler exactly what to display on the screen as a result of the user's input. This component therefore effectively constitutes a Telnet web browser.

The MUI server 208 is the common component between the other servers described herein. It receives queries from the various servers, it processes the queries and formats the output into XML, and finally this XML is processed with an XSL parser into whatever language the server that calls it understands. For example, if the Telnet State Machine started the query, the MUI server 208 will return TML (Telnet Markup Language).

The HTTP Listener 210 performs a gateway function between any HTTP client (e.g. web browser 214) and the MUI server 208. HTTP clients use HTML forms to submit data to the MUI server 208. The query and all pertinent query information is enclosed in this data. The MUI server 208 then processes the query and creates an XML message out of the result-set. Just as in the Telnet Server, the XML message is processed by an XSL parser, and the result is sent back to the HTTP client in encoded in HTML.

Operation of the Telnet Server

Referring to FIG. 3, it illustrates a Telnet Server configuration of system 100. In the Telnet Server configuration, a Telnet Daemon 302 listens to requests from multiple Telnet Clients 304 and creates a socket and spawns a thread for every client. A Telnet Input/Output handler 306 is created in the thread for every client. The I/O handler 306 negotiates with the client 304 for terminal parameters at the beginning, creates session parameters and passes them to a Telnet State Machine 308.

Subsequently, the I/O handler 306 reads raw data from the client 304, formats it and by sends it to the Telnet State Machine 308. The State Machine 308 formulates queries based on user input and calls the appropriate query handler function in an MUI server 310. The state machine 308 also maintains a dynamic page log that it uses to control the state (page and fields) of the client 304. Based on the query string sent by the Telnet State Machine 308, the MUI server 310 formulates the actual SQL query using the appropriate query handling function and sends it to the database 312. The MUI server 310 also uses a connection pool to efficiently handle connections to the database 312. The database 312 processes the query and sends back the result-set encoded in XML to the MUI server 310. The MUI server 310 next calls the XSL parser using the relevant XSL Style-sheet and the XML DTD (document type definition). The processed style-sheet is then sent to the Telnet State Machine 308. The State Machine 308 formats the data for printing and sends the result text to be printed to the I/O handler 306. The handler 306 finally dumps the final output to the Telnet Client 304.

Hardware Overview

Figure 4:
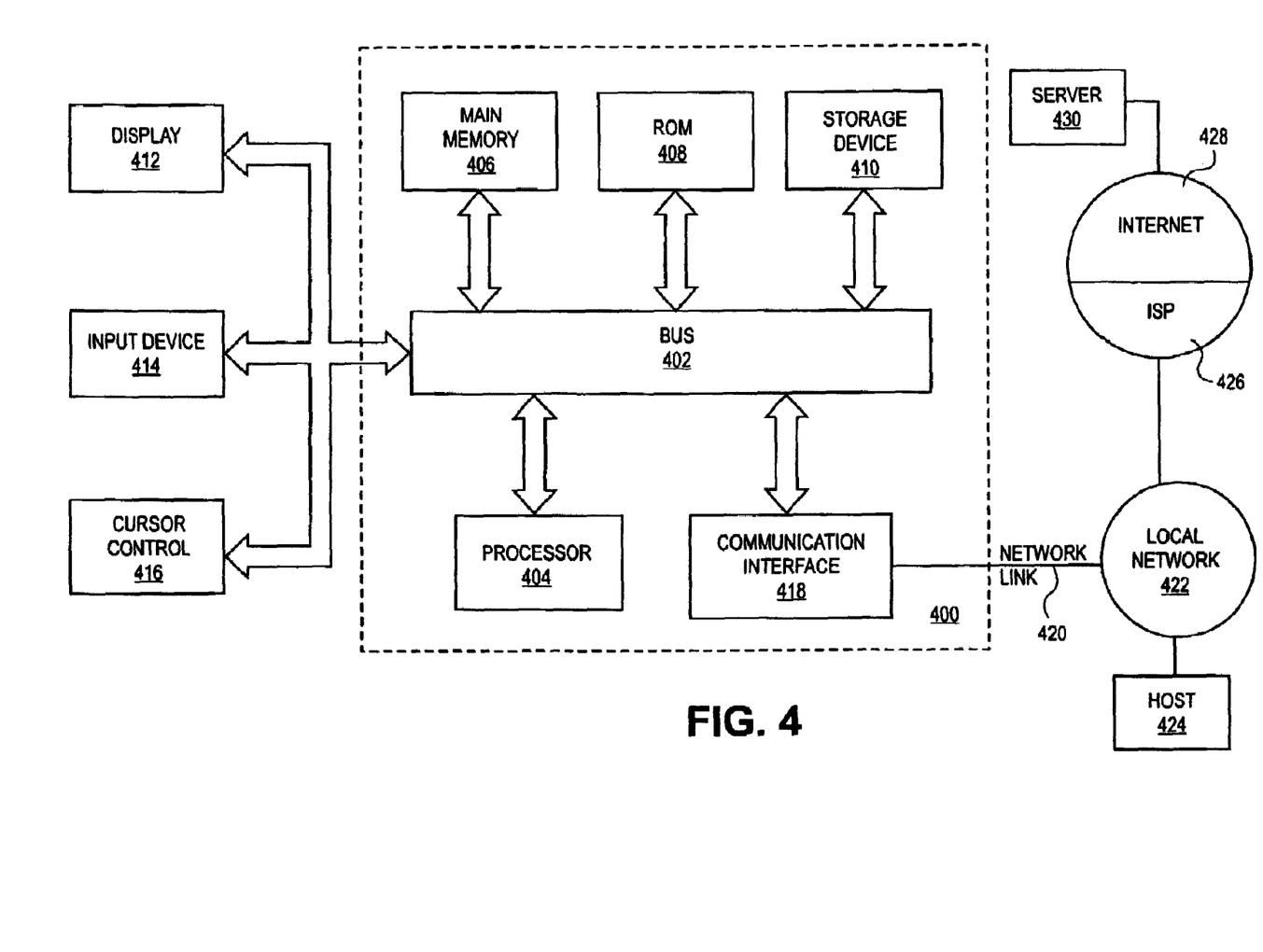
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allowing multiple types of clients to use a database application without hard-coding presentation logic for each of the multiple types of clients into the database application, the method comprising the steps of:

receiving, from a particular client, a request for data that is to be used by the particular client in a user interface, wherein the user interface is operable to receive input from a user and to cause entry of the input into the database application;

prior to providing the data from the database application to the particular client, performing the steps of:

converting the data that is to be transmitted from the database application to the particular client into an XML output without regard to the device type of the particular client by performing certain steps that include:

identifying a data type to which the data corresponds, wherein the data that is to be transmitted from the database application to the particular client comprises a message that is to be displayed in the user interface;

selecting from a plurality of document type definitions, a document type definition associated with said data type, wherein said document type definition includes: (a) at least one attribute indicating a message type of said message, wherein said message type is any one of a normal message, an error message, a warning message, and a hint message, and (b) at least one attribute indicating how to display said message in said user interface; and converting the data to the XML output based on said selected document type definition;

identifying the particular client device type of the particular client, wherein the particular client device type indicates one of a dumb terminal, a telnet terminal, a bar code scanner, and a browser-less device;

wherein sets of metadata are each associated with a client device type of a plurality of client device types and indicates how to convert said XML output to output for the client device type;

selecting, based on the particular client device type, a particular set of metadata from among the sets of metadata; and based on the particular set of metadata, converting the XML output to output for the particular client device type; and providing the output for the particular client device type to the particular client.

2. The method of claim 1 wherein:

the step of reading the particular set of metadata includes reading an XSL style sheet associated with said particular client device type; and the step of converting the XML output includes applying the XSL style sheet to said XML output.

3. The method of claim 1 wherein the step of converting the data that is to be transmitted from the database application to the particular client into an XML output includes converting the data based on one or more document type definition files.

4. The method of claim 1 wherein:

the particular client is a Telnet client;

the Telnet client communicates with a Telnet server to request data from said database application; and the step of providing said output to said particular client includes the steps of sending the output to said Telnet server using a recipient specific format; and said Telnet server providing said output to said Telnet client.

5. The method of claim 1 wherein the XML output includes display instruction data indicating that said data is to be displayed in a first manner.

6. The method of claim 5 wherein the step of converting the XML output includes the step of generating output for said particular client device type that causes said data to be displayed in a second manner that is different than said first manner when said particular client device type is not able to display said data in the first manner.

7. A method for using a database application with multiple clients that support multiple mark-up language interpreters without hard-coding into the database application logic to support each of the multiple mark-up language interpreters, the method comprising the steps of:

receiving, from a particular client, a request for first data that is to be used by the particular client in a user interface, wherein the user interface is operable to receive input from a user and to cause entry of the input into the database application;

converting output of the database application to the first data that conforms to a first mark-up language without regard to the type of mark-up language interpreter supported by the particular client to which the output first data is to be sent by performing certain steps that include:

identifying a data type to which the first data corresponds, wherein the first data comprises a message that is to be displayed in the user interface;

selecting from a plurality of document type definitions, a document type definition associated with said data type, wherein said document type definition includes: (a) at least one attribute indicating a message type of said message, wherein said message type is any one of a normal message, an error message, a warning message, and a hint message, and (b) at least one attribute indicating how to display said message in said user interface; and converting the first data to XML output based on said selected document type definition;

wherein a plurality of mark-up languages are each associated with one or more client device types of a plurality of client device types, wherein the plurality of client device types include at least one of a dumb terminal client device type, a telnet terminal client device type, a bar code scanner client device type, and a browser-less client device type;

selecting, based on a client device type of the particular client, a second mark-up language of said plurality of mark-up languages that is different than said first mark-up language;

converting the XML output to second data that conforms to the second mark-up language; and sending the second data to the particular client.

8. The method of claim 7 wherein the step of converting the XML output to the second data is performed by applying an XSL style sheet to said XML output.

9. The method of claim 7 wherein the step of sending the second data to the client includes sending the data to a server to which the client is connected through a wireless connection, and then sending the data from the server to the client over said wireless connection.

10. A system comprising:
a database system;
a database application operatively coupled to said database system;
said database application including:
application logic that:
receives a request for first output that is to be used by a client device in a user interface, wherein the user interface is operable to receive input from a user and to cause entry of the input into the database application;
retrieves data from said database system to produce the first output in a format that is independent of a type of the client device that is to receive the first output;
an XML processor that:
identifies a data type to which the data retrieved from the database system corresponds, wherein the data comprises a message that is to be displayed in the user interface;
identifies a document type definition associated with said data type, wherein said document type definition includes: (a) at least one attribute indicating a message type of said message, wherein said message type is any one of a normal message, an error message, a warning message, and a hint message, and (b) at least one attribute indicating how to display said message in said user interface; and
applies the document type definition to the data retrieved from the database system, thereby formatting the data into XML to produce second output that is independent of the type of the client device that is to receive the first output; and
an XSL processor that converts the second output into the first output based on an XSL style sheet associated with the type of the client device that is to receive the first output; wherein the XSL style sheet is selected based on the type of the client device.

11. The system of claim 10 further comprising:
a plurality of servers operatively coupled to said database application;
said plurality of servers including at least a first server configured to provide services to clients that support a first protocol and a second server configured to provide services to clients that support a second protocol that is different from said first protocol; and
a plurality of clients including a first client that interacts with said database application through said first server and a second client that interacts with said database application through said second server.

12. A computer-readable medium carrying instructions for allowing multiple types of clients to use a database application without hard-coding presentation logic for each of the multiple types of clients into the database application, the instructions including instructions for performing the steps of:
receiving, from a particular client, a request for data that is to be used by the particular client in a user interface, wherein the user interface is operable to receive input from a user and to cause entry of the input into the database application;
prior to providing the data from the database application to the particular client, performing the steps of:
converting the data that is to be transmitted from the database application to the particular client into an XML output without regard to the device type of the particular client by performing certain steps that include:
identifying a data type to which the data corresponds, wherein the data that is to be transmitted from the database application to the particular client comprises a message that is to be displayed in the user interface;
selecting from a plurality of document type definitions, a document type definition associated with said data type, wherein said document type definition includes: (a) at least one attribute indicating a message type of said message, wherein said message type is any one of a normal message, an error message, a warning message, and a hint message, and (b) at least one attribute indicating how to display said message in said user interface; and
converting the data to the XML output based on said selected document type definition;
identifying the particular client device type of the particular client, wherein the particular client device type indicates one of a dumb terminal, a telnet terminal, a bar code scanner, and a browser-less device;
wherein sets of metadata are each associated with a client device type of a plurality of client device types and indicates how to convert said XML output to output for the client device type;
selecting, based on the particular client device type, a particular set of metadata from among the sets of metadata; and
based on the particular set of metadata, converting the XML output to output for the particular client device type; and
providing the output for the particular client device type to the particular client.

13. The computer-readable medium of claim 12 wherein:
the step of reading the particular set of metadata includes reading an XSL style sheet associated with said particular client device type; and
the step of converting the XML output includes applying the XSL style sheet to said XML output.

14. The computer-readable medium of claim 12 wherein the step of converting the data that is to be transmitted from the database application to the particular client into an XML output includes converting the data based on one or more document type definition files.

15. The computer-readable medium of claim 12 wherein:
the particular client is a Telnet client;
the Telnet client communicates with a Telnet server to request data from said database application; and
the step of providing said output to said particular client includes the steps of sending the output to said Telnet server using a recipient specific format; and said Telnet server providing said output to said Telnet client.

16. The computer-readable medium of claim 12 wherein the XML output includes display instruction data indicating that said data is to be displayed in a first manner.

17. The computer-readable medium of claim 16 wherein the step of converting the XML output includes the step of generating output for said particular client device type that causes said data to be displayed in a second manner that is different than said first manner when said particular client device type is not able to display said data in the first manner.

18. The system of claim 10, wherein the type of client device comprises at least one of a dumb terminal, a telnet terminal, a bar code scanner, and a browser-less device.

19. The method of claim 1, further comprising:
receiving, from the particular client, a second request for second data that is to be used by the particular client in the user interface; and
prior to providing the second data from the database application to the particular client, performing the steps of:
converting the second data into a second XML output without regard to the device type of the particular client by performing certain steps that include:
identifying a second data type to which the second data corresponds, wherein the second data type indicates that the second data is one of a data entry form, a queried data, a form level query data, and a field level query data;
selecting from the plurality of document type definitions, second document type definition associated with said second data type, wherein said second document type definition includes one or more attributes indicating how to display said second data in said user interface; and
converting said second data to the second XML output based on said second document type definition;
selecting, based on the particular device type, a second set of metadata from among the sets of metadata; and
based on the second set of metadata, converting the second XML output to the output for the particular client device type;
wherein the step of providing the output to the particular client further comprises providing to the particular client the output that includes the second XML output.

20. The system of claim 10, wherein:
the data further comprises at least one of a data entry form, a queried data, a form level query data, and a field level query data; and
the data type definition is included in a plurality of document type definitions that the XML processor is configured to access, wherein the plurality of document type definitions include at least one document type definition associated with at least one data type for each of the data entry form, the queried data, the form level query data, and the field level query data, and wherein the at least one document type definition includes one or more attributes indicating how to display in the user interface each of the data entry form, the queried data, the form level query data, and the field level query data.

21. The computer readable medium of claim 12, further including instructions for performing the steps of:
receiving, from the particular client, a second request for second data that is to be used by the particular client in the user interface; and
prior to providing the second data from the database application to the particular client, performing the steps of:
converting the second data into a second XML output without regard to the device type of the particular client by performing certain steps that include:
identifying a second data type to which the second data corresponds, wherein the second data type indicates that the second data is one of a data entry form, a queried data, a form level query data, and a field level query data;
selecting from the plurality of document type definitions, second document type definition associated with said second data type, wherein said second document type definition includes one or more attributes indicating how to display said second data in said user interface; and
converting said second data to the second XML output based on said second document type definition;
selecting, based on the particular device type, a second set of metadata from among the sets of metadata; and
based on the second set of metadata, converting the second XML output to the output for the particular client device type;
wherein the step of providing the output to the particular client further comprises providing to the particular client the output that includes the second XML output.

* * * * *

UNITED STATES PATENT AND TRADEMARK OFFICE
CERTIFICATE OF CORRECTION

| | |
|---|---|
| PATENT NO. | : 7,200,809 B1 |
| APPLICATION NO. | : 09/631884 |
| DATED | : April 3, 2007 |
| INVENTOR(S) | : Jyotirmoy Paul et al. |

Page 1 of 1

It is certified that error appears in the above-identified patent and that said Letters Patent is hereby corrected as shown below:

COLUMN 16
Claim 7: Line 55, please delete "output".

Signed and Sealed this

Tenth Day of July, 2007

JON W. DUDAS
*Director of the United States Patent and Trademark Office*